United States Patent
Wigard et al.

(10) Patent No.: US 12,160,832 B2
(45) Date of Patent: Dec. 3, 2024

(54) APPARATUS, METHOD AND COMPUTER PROGRAM FOR UE CELL SELECTION CONTROL IN NON-TERRESTRIAL NETWORKS

(71) Applicant: NOKIA TECHNOLOGIES OY, Espoo (FI)

(72) Inventors: Jeroen Wigard, Klarup (DK); Daniela Laselva, Klarup (DK); István Zsolt Kovács, Aalborg (DK); Mads Lauridsen, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 429 days.

(21) Appl. No.: 17/429,858

(22) PCT Filed: Feb. 11, 2019

(86) PCT No.: PCT/FI2019/050102
§ 371 (c)(1),
(2) Date: Aug. 10, 2021

(87) PCT Pub. No.: WO2020/165485
PCT Pub. Date: Aug. 20, 2020

(65) Prior Publication Data
US 2023/0022283 A1    Jan. 26, 2023

(51) Int. Cl.
*H04W 52/40* (2009.01)
*H04W 52/24* (2009.01)
*H04W 52/38* (2009.01)

(52) U.S. Cl.
CPC ....... *H04W 52/241* (2013.01); *H04W 52/243* (2013.01); *H04W 52/386* (2013.01)

(58) Field of Classification Search
CPC .......... H04W 36/0083; H04W 52/143; H04W 52/241; H04W 52/283; H04W 52/386;
(Continued)

(56) References Cited

U.S. PATENT DOCUMENTS

| 5,918,176 A | 6/1999 | Arrington, Jr. et al. |
| 10,178,702 B2 * | 1/2019 | Tenny .................. H04W 76/36 |

(Continued)

FOREIGN PATENT DOCUMENTS

| CN | 104521181 A | 4/2015 |
| CN | 108093454 A | 5/2018 |

(Continued)

OTHER PUBLICATIONS

Extended European Search Report dated Sep. 7, 2022, corresponding to European Patent Application No. 19914786.9.

(Continued)

*Primary Examiner* — Jean A Gelin
(74) *Attorney, Agent, or Firm* — SQUIRE PATTON BOGGS (US) LLP

(57) ABSTRACT

There is provided an apparatus, said apparatus comprising means for determining which of at least two lower layer radio units co-located at a first location, each lower layer radio unit associated with a higher layer radio unit, has a best path to the associated higher layer radio unit and causing the transmit power of the determined one of the at least two lower layer radio units received at a user equipment to be higher relative to the transmit power of any of the other of the at least two lower layer radio units received at the user equipment.

16 Claims, 11 Drawing Sheets

(58) Field of Classification Search
CPC . H04W 52/40; H04B 7/18513; H04B 7/1851; H04B 7/18541; H04B 7/18504
See application file for complete search history.

(56) References Cited

U.S. PATENT DOCUMENTS

| | | | |
|---|---|---|---|
| 10,952,083 B2* | 3/2021 | Novlan | H04L 5/0053 |
| 11,206,106 B2* | 12/2021 | He | H04L 1/1628 |
| 2014/0016576 A1* | 1/2014 | Noh | H04W 52/247 370/329 |
| 2014/0369305 A1* | 12/2014 | Lee | H04W 88/085 370/328 |
| 2016/0278110 A1* | 9/2016 | Lee | H04W 52/0219 |
| 2016/0295601 A1* | 10/2016 | Fang | H04W 72/12 |
| 2017/0105153 A1 | 4/2017 | Ashrafi et al. | |
| 2018/0063854 A1* | 3/2018 | Kanamarlapudi | H04W 72/56 |
| 2018/0279193 A1* | 9/2018 | Park | H04W 36/26 |
| 2018/0302878 A1* | 10/2018 | Byun | H04W 88/16 |
| 2018/0338277 A1* | 11/2018 | Byun | H04W 74/0833 |
| 2018/0367255 A1* | 12/2018 | Jeon | H04W 72/23 |
| 2018/0368109 A1* | 12/2018 | Kim | H04W 72/04 |
| 2019/0037522 A1* | 1/2019 | Tenny | H04W 36/04 |
| 2019/0104507 A1* | 4/2019 | Majmundar | H04W 36/0069 |
| 2019/0253986 A1* | 8/2019 | Jeon | H04L 5/0048 |
| 2019/0254013 A1* | 8/2019 | Chang | H04L 5/00 |
| 2019/0261424 A1* | 8/2019 | Park | H04W 74/006 |
| 2020/0413315 A1* | 12/2020 | Palenius | H04W 36/302 |
| 2021/0084539 A1* | 3/2021 | Centonza | H04W 28/06 |
| 2021/0092584 A1* | 3/2021 | Zou | H04W 4/029 |
| 2021/0378053 A1* | 12/2021 | Saily | H04W 48/20 |
| 2022/0386197 A1* | 12/2022 | Hwang | H04W 36/00835 |

FOREIGN PATENT DOCUMENTS

| | | |
|---|---|---|
| EP | 3332489 A1 | 6/2018 |
| WO | 2004002016 A2 | 12/2003 |
| WO | WO 2010/031066 A2 | 3/2010 |
| WO | WO 2018/215901 A1 | 11/2018 |

OTHER PUBLICATIONS

International Search Report and Written Opinion dated Aug. 28, 2019 corresponding to International Patent Application No. PCT/FI2019/050102.
3GPP TR 38.821 V0.3.0 (Nov. 2018), Technical Report, 3rd Generation Partnership Project; Technical Specification Group Radio Access Network; Solutions for NR to support non-terrestrial networks (NTN) (Release 16), Dec. 1, 2018.
3GPP TR 38.811 V15.0.0 (Jun. 2018), Technical Report, 3rd Generation Partnership Project; Technical Specification Group Radio Access Network; Study on New Radio (NR) to support non terrestrial networks (Release 15), Aug. 10, 2018.
Nokia et al., "NTN architecture and scenario to be prioritized," 3GPP Draft; R2-1818369, 3GPP TSG-RAN WG2 Meeting #104, Spokane, USA, Nov. 2, 2018.
Nokia et al., "Further considerations on Mobility impacts for LEO based networks," 3GPP Draft; R2-1818376, 3GPP TSG-RAN WG2 Meeting #104, Spokane, USA, Nov. 2, 2018.
3GPP TS 22.261 V16.6.0 (Dec. 2018), Technical Specification, 3rd Generation Partnership Project; Technical Specification Group Services and System Aspects; Service requirements for the 5G system; Stage 1 (Release 16), Dec. 2018.
3GPP TS 23.122 V16.0.0 (Dec. 2018), Technical Specification, 3rd Generation Partnership Project; Technical Specification Group Core Network and Terminals; Non-Access-Stratum (NAS) functions related to Mobile Station (MS) in idle mode (Release 16), Dec. 2018.
3GPP TS 38.101-1 V15.4.0 (Dec. 2018), Technical Specification, 3rd Generation Partnership Project; Technical Specification Group Radio Access Network; NR; User Equipment (UE) radio transmission and reception; Part 1: Range 1 Standalone (Release 15), Dec. 2018.
3GPP TS 38.101-2 V15.4.0 (Dec. 2018), Technical Specification, 3rd Generation Partnership Project; Technical Specification Group Radio Access Network; NR; User Equipment (UE) radio transmission and reception; Part 2: Range 2 Standalone (Release 15), Dec. 2018.
3GPP TS 38.101-3 V15.4.0 (Dec. 2018), Technical Specification, 3rd Generation Partnership Project; Technical Specification Group Radio Access Network; NR; User Equipment (UE) radio transmission and reception; Part 3: Range 1 and Range 2 Interworking operation with other radios (Release 15), Dec. 2018.
3GPP TS 38.101-4 V15.0.0 (Dec. 2018), Technical Specification, 3rd Generation Partnership Project; Technical Specification Group Radio Access Network; NR; User Equipment (UE) radio transmission and reception; Part 4: Performance requirements (Release 15), Dec. 2018.
3GPP TS 38.213 V15.4.0 (Dec. 2018), Technical Specification, 3rd Generation Partnership Project; Technical Specification Group Radio Access Network; NR; Physical layer procedures for control (Release 15), Dec. 2018.
3GPP TS 38.300 V15.4.0 (Dec. 2018), Technical Specification, 3rd Generation Partnership Project; Technical Specification Group Radio Access Network; NR; NR and NG-RAN Overall Description; Stage 2 (Release 15), Dec. 2018.
3GPP TS 38.304 V15.2.0 (Dec. 2018), Technical Specification, 3rd Generation Partnership Project; Technical Specification Group Radio Access Network; NR; User Equipment (UE) procedures in Idle mode and RRC Inactive state (Release 15), Dec. 2018.
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), Dec. 2018.
3GPP TS 38.401 V15.4.0 (Dec. 2018), Technical Specification, 3rd Generation Partnership Project; Technical Specification Group Radio Access Network; NG-RAN; Architecture description (Release 15), Dec. 2018.
Chinese Office Action issued in corresponding Chinese Patent Application No. 2019800953342 on Jul. 2, 2024.

* cited by examiner

S1 — Determining which of at least two lower layer radio units co-located at a first location, each lower layer radio unit associated with a higher layer radio unit, has a best path to the associated higher layer radio unit S2 — Causing the transmit power of the determined one of the at least two lower layer radio units received at a user equipment to be higher relative to the transmit power of any of the other of the at least two lower layer radio units received at the user equipment

Figure 8

APPARATUS, METHOD AND COMPUTER PROGRAM FOR UE CELL SELECTION CONTROL IN NON-TERRESTRIAL NETWORKS

FIELD

The present application relates to a method, apparatus, system and computer program and in particular but not exclusively to user equipment (UE) cell selection control in non-terrestrial networks (NTN).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for determining which of at least two lower layer radio units co-located at a first location, each lower layer radio unit associated with a higher layer radio unit, has a best path to the associated higher layer radio unit and causing the transmit power of the determined one of the at least two lower layer radio units received at a user equipment to be higher relative to the transmit power of any of the other of the at least two lower layer radio units received at the user equipment.

Means for causing the transmit power of the determined one of the at least two lower layer radio units received at the user equipment to be higher relative to the transmit power of any of the other of the lower layer radio units received at the user equipment may comprise means for increasing the transmit power of the determined distributed unit relative to the transmit power of any of the other of the lower layer radio units.

Means for causing the transmit power of the determined one of the at least two lower layer radio units received at the user equipment to be higher relative to the transmit power of any of the other of lower layer radio units received at the user equipment may comprise means for providing an indication to the user equipment of an offset for the received transmit power.

The offset may be a negative offset applicable to the transmit power received from any of the other of the at least two lower layer radio units.

The offset may be a positive offset applicable to the received power from the determined one of the at least two lower layer radio units.

The apparatus may comprise means for providing the indication of the offset in a broadcast channel or dedicated signalling to the user equipment.

The at least two lower layer radio units may be co-located on a satellite.

The relative increase in the transmit power may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The determining may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The relative increase in the transmit power may be based on at least one of the location of the user equipment and the transmit power of a signal received at the at least two lower layer radio units from each of the higher layer radio units.

The determining may be based on at least one of the location of the user equipment, the transmit power of a signal received at the at least two lower layer radio units from each of the higher layer radio units, a delay at the higher layer radio units and capacity of each of the higher layer radio units.

The best path may be defined by handover performance.

Each lower layer radio unit may comprises a next generation NodeB distributed unit, gNB-DU.

Each higher layer radio unit may comprise a next generation NodeB centralised unit, gNB-CU.

Each of the higher layer radio units may be located at a different location.

In a second aspect, there is provided In a first aspect there is provided a method comprising determining which of at least two lower layer radio units co-located at a first location, each lower layer radio unit associated with a higher layer radio unit, has a best path to the associated higher layer radio unit and causing the transmit power of the determined one of the at least two lower layer radio units received at a user equipment to be higher relative to the transmit power of any of the other of the at least two lower layer radio units received at the user equipment.

Causing the transmit power of the determined one of the at least two lower layer radio units received at the user equipment to be higher relative to the transmit power of any of the other of the lower layer radio units received at the user equipment may comprise increasing the transmit power of the determined distributed unit relative to the transmit power of any of the other of the lower layer radio units.

Causing the transmit power of the determined one of the at least two lower layer radio units received at the user equipment to be higher relative to the transmit power of any of the other of lower layer radio units received at the user equipment may comprise providing an indication to the user equipment of an offset for the received transmit power.

The offset may be a negative offset applicable to the transmit power received from any of the other of the at least two lower layer radio units.

The offset may be a positive offset applicable to the received power from the determined one of the at least two lower layer radio units.

The method may comprise providing the indication of the offset in a broadcast channel or dedicated signalling to the user equipment.

The at least two lower layer radio units may be co-located on a satellite.

The relative increase in the transmit power may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The determining may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The relative increase in the transmit power may be based on at least one of the location of the user equipment and the transmit power of a signal received at the at least two lower layer radio units from each of the higher layer radio units.

The determining may be based on at least one of the location of the user equipment, the transmit power of a signal received at the at least two lower layer radio units from each of the higher layer radio units, a delay at the higher layer radio units and capacity of each of the higher layer radio units.

The best path may be defined by handover performance.

Each lower layer radio unit may comprises a next generation NodeB distributed unit, gNB-DU.

Each higher layer radio unit may comprise a next generation NodeB centralised unit, gNB-CU.

Each of the higher layer radio units may be located at a different location.

In a third aspect there is provided an apparatus comprising: at least one processor and at least one memory including a computer program code, the at least one memory and computer program code configured to, with the at least one processor, cause the apparatus at least to determine which of at least two lower layer radio units co-located at a first location, each lower layer radio unit associated with a higher layer radio unit, has a best path to the associated higher layer radio unit and cause the transmit power of the determined one of the at least two lower layer radio units received at a user equipment to be higher relative to the transmit power of any of the other of the at least two lower layer radio units received at the user equipment.

The apparatus may be configured to increase the transmit power of the determined distributed unit relative to the transmit power of any of the other of the lower layer radio units.

The apparatus may be configured to provide an indication to the user equipment of an offset for the received transmit power.

The offset may be a negative offset applicable to the transmit power received from any of the other of the at least two lower layer radio units.

The offset may be a positive offset applicable to the received power from the determined one of the at least two lower layer radio units.

The apparatus be configured to provide the indication of the offset in a broadcast channel or dedicated signalling to the user equipment.

The at least two lower layer radio units may be co-located on a satellite.

The relative increase in the transmit power may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The apparatus may be configured to determine which of at least two lower layer radio units co-located at a first location has a best path to the associated higher layer radio unit based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The relative increase in the transmit power may be based on at least one of the location of the user equipment and the transmit power of a signal received at the at least two lower layer radio units from each of the higher layer radio units.

The apparatus may be configured to determine which of at least two lower layer radio units co-located at a first location has a best path to the associated higher layer radio unit based on at least one of the location of the user equipment, the transmit power of a signal received at the at least two lower layer radio units from each of the higher layer radio units, a delay at the higher layer radio units and capacity of each of the higher layer radio units.

The best path may be defined by handover performance.

Each lower layer radio unit may comprises a next generation NodeB distributed unit, gNB-DU.

Each higher layer radio unit may comprise a next generation NodeB centralised unit, gNB-CU.

Each of the higher layer radio units may be located at a different location.

In a fourth aspect there is provided a computer readable medium comprising program instructions for causing an apparatus to perform at least the following determining which of at least two lower layer radio units co-located at a first location, each lower layer radio unit associated with a higher layer radio unit, has a best path to the associated higher layer radio unit and causing the transmit power of the determined one of the at least two lower layer radio units received at a user equipment to be higher relative to the transmit power of any of the other of the at least two lower layer radio units received at the user equipment.

Causing the transmit power of the determined one of the at least two lower layer radio units received at the user equipment to be higher relative to the transmit power of any of the other of the lower layer radio units received at the user equipment may comprise increasing the transmit power of the determined distributed unit relative to the transmit power of any of the other of the lower layer radio units.

Causing the transmit power of the determined one of the at least two lower layer radio units received at the user equipment to be higher relative to the transmit power of any of the other of lower layer radio units received at the user equipment may comprise providing an indication to the user equipment of an offset for the received transmit power.

The offset may be a negative offset applicable to the transmit power received from any of the other of the at least two lower layer radio units.

The offset may be a positive offset applicable to the received power from the determined one of the at least two lower layer radio units.

The apparatus may be caused to perform providing the indication of the offset in a broadcast channel or dedicated signalling to the user equipment.

The at least two lower layer radio units may be co-located on a satellite.

The relative increase in the transmit power may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The determining may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

The relative increase in the transmit power may be based on at least one of the location of the user equipment and the transmit power of a signal received at the at least two lower layer radio units from each of the higher layer radio units.

The determining may be based on at least one of the location of the user equipment, the transmit power of a signal received at the at least two lower layer radio units from each of the higher layer radio units, a delay at the higher layer radio units and capacity of each of the higher layer radio units.

The best path may be defined by handover performance.

Each lower layer radio unit may comprises a next generation NodeB distributed unit, gNB-DU.

Each higher layer radio unit may comprise a next generation NodeB centralised unit, gNB-CU.

Each of the higher layer radio units may be located at a different location.

In a fifth aspect there is provided a non-transitory computer readable medium comprising program instructions for causing an apparatus to perform at least the method according to the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 8 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
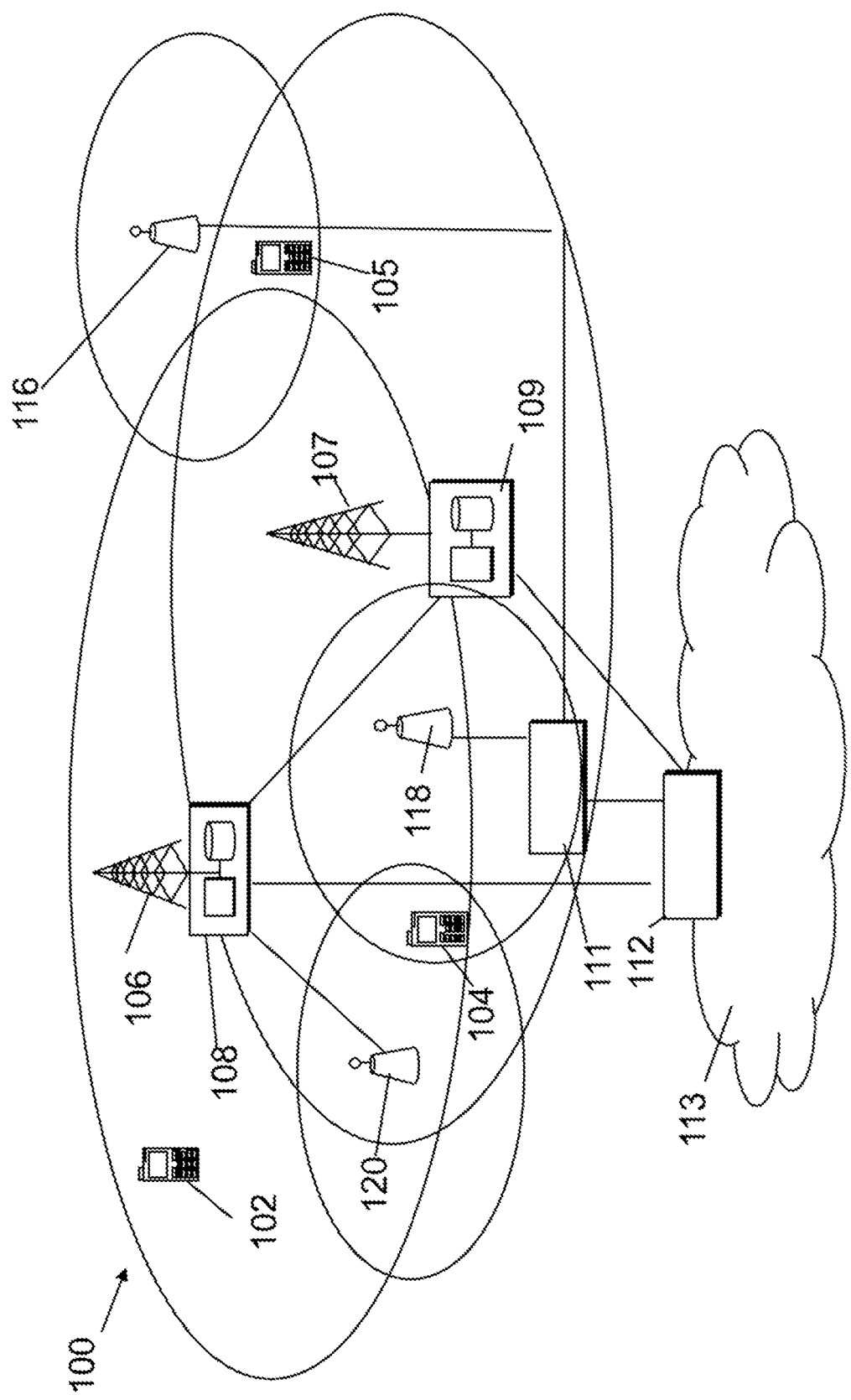
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g. next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
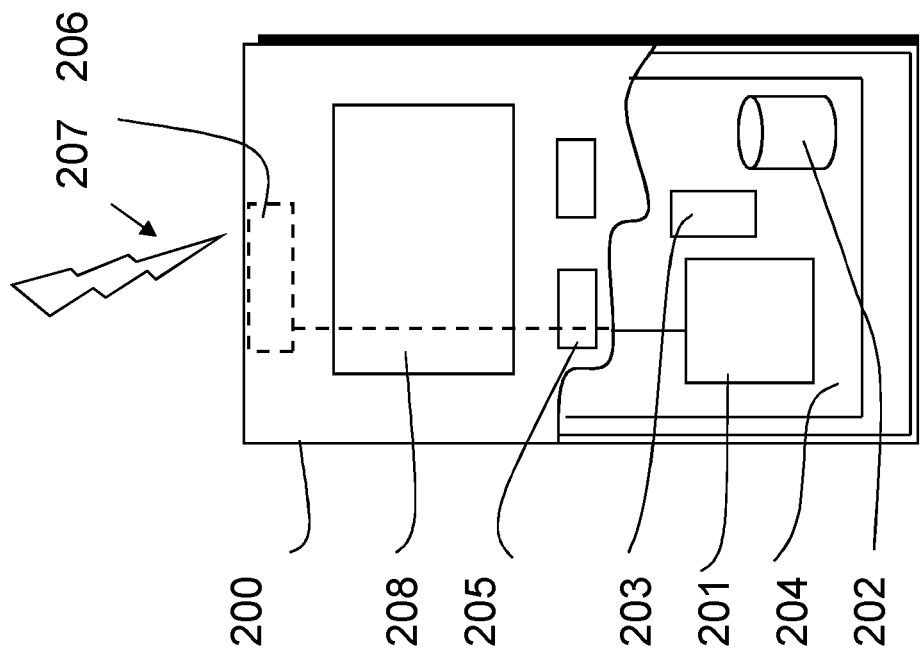
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g. a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
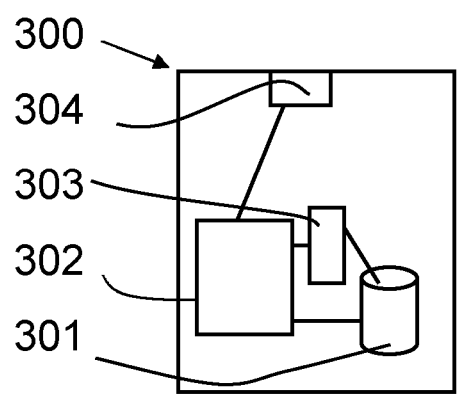
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

The 3GPP is studying how to enable non-terrestrial networks (NTN) using New Radio (NR). The work is detailed in the study item TR 38.821 (Solutions for NR to support non-terrestrial networks). One research area is how to provide seamless connectivity to terrestrial UEs, i.e. to provide a continuous data connection without handover (and other) interruptions.

Currently, multiple architecture solutions are under study for three satellite categories; Geostationary Earth Orbit (GEO), Low-Earth Orbit (LEO), and High-Altitude Platform Systems (HAPS). One solution is based on the NR-enabled gNB central unit (gNB-CU, also referred to as CU in the following) and gNB distributed unit (gNB-DU, also referred to as DU in the following) split, where the CU is a higher layer radio unit (e.g., containing PDCP, RLC and RRC layers) and is located on earth, while the DU is a lower layer radio unit (e.g., containing PHY and MAC layers) and is located on-board the satellite. The CU-DU split is facilitated using the F1-interface through a ground station backhaul. One DU may be connected to one CU at a time, while one CU may control multiple DUs. 3GPP TS 38.401 describes CU-DU split architecture.

The following relates to the non-terrestrial networks, which move relative to the earth (i.e. LEO and HAPS). Since those satellites are moving, the DU (located on-board the satellite) at some point will need to break the connection with the currently serving CU (on earth) and connect with the next CU (or at least a next ground station, which may be connected with the current CU). It has been proposed to deploy dual-DU configuration on a satellite, so that while one DU is connected to the CU of the closest 'serving' ground station, the other DU may be connected to the next determined 'serving' CU/ground station. The dual-DUs may avoid shutting down the first F1 interface before setting up the new F1 interface, which may reduce the associated delay and interruptions in ongoing connections. The dual-DU configuration requires a satellite constellation and ground station locations appropriately designed to allow each satellite to have two simultaneously active feeder link connections to two different ground station (in radio range).

If the NTN UEs on Earth are equipped with Dual Connectivity (DC) capabilities, they are able to connect to both DUs on the same satellite at the same time and experience the seamless connectivity transition from one ground station to the other. This may be achieved by the UE by performing a role-swap from PCell to PSCell between the two DUs, whenever the DUs change ground station. NTN UEs with DC capability may also connect to two different satellites, further improving the connectivity. The latter DC option is assumed to work as in traditional terrestrial 5G NR network deployments. The former DC option is in the scope of this following.

Assuming a dual-DU deployment on a satellite combined with DC UEs as explained above, one issue is how a UE powering ON for the first time or initiating cell re-selection or upon transiting from RRC_Idle/RRC_Inactive to RRC_Connected will choose between the two DUs, which are registered with the same PLMN and are currently both providing coverage to the UE, but are connected to different CUs.

Since the two DUs are on the same satellite and provide coverage to the same area on Earth (same antenna beam size), the propagation loss (path loss+shadow fading) between the individual DUs and UE is expected to be identical for two DUs operating on the same frequency band (either two identical frequencies or two frequencies close to each other). The UE may thus randomly connect to one of the two DUs, and thus randomly select one of the two CUs too.

The distance of feeder link of the two DUs may be different and it may be preferable to use the shorter (best) feeder link for optimising performance (e.g., delay, reliability). However, with the current setup the UE would choose a DU and thus feeder link, to the relevant CU based on the service link, which does not show the difference in the feeder link.

Figure 4:
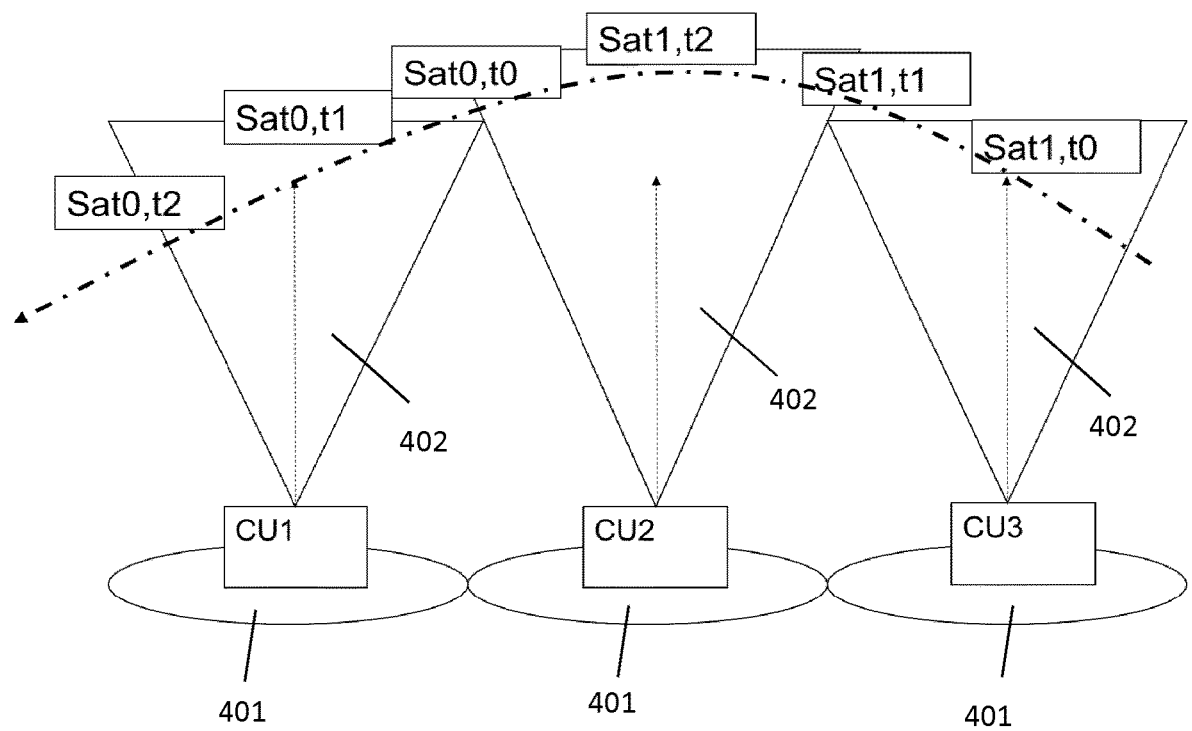
FIG. 4 shows a schematic diagram of an example dual-DU split architecture.
Figure 5:
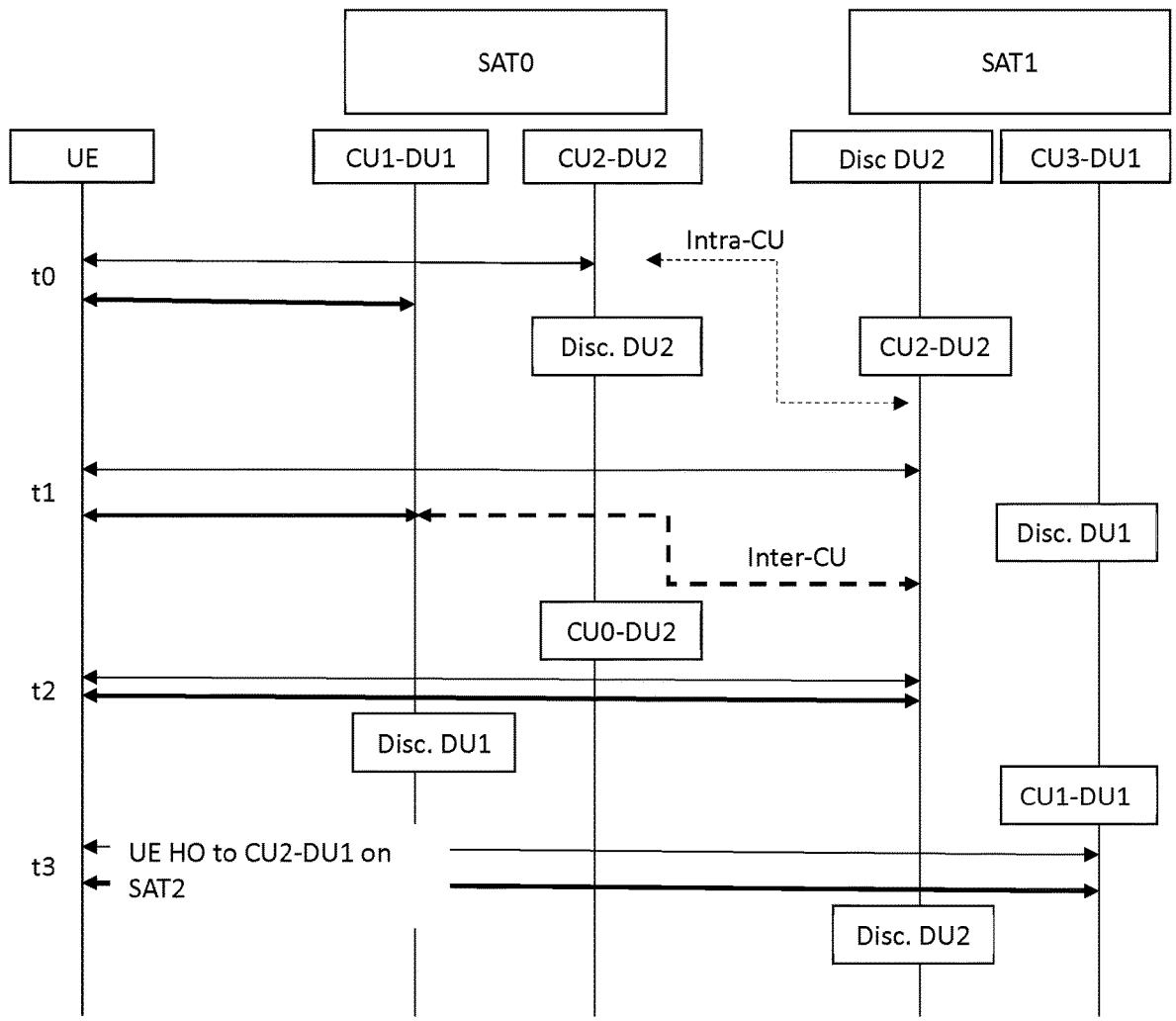
FIG. 5 shows an event flow for the example architecture of FIG. 4.

The issue is illustrated in FIGS. 4 and 5 for a UE and satellite which undergo the following steps.

FIG. 4 illustrates the area 401 where the passing satellite experiences the shortest distance to the CU and the ground station (CU) coverage 402 of the satellites orbit.

FIG. 5 illustrates an event flow for FIG. 4. The optimal connectivity flow alternative is shown with thinner arrows, while the suboptimal connectivity flow is shown with thicker arrows.

Table 1 provides an event flow for FIG. 4. The final two columns show the connectivity (CU change event) flow in two classes, if the UE selects the optimal or suboptimal DU.

At time t0, the stationary UE appears in the area near CU2. Sat0 is the only satellite serving that area currently, and its two DUs are connected to CU1 and CU2, respectively, meaning that the UE needs to select either CU1-DU or CU2-DU as serving cell. We assume that CU2-DU is selected, as it is the optimal choice to optimize feeder link performance and minimize potential CU handovers (see t2).

At time t1, Sat0 has moved fully into the coverage of CU1 and is no longer connected with CU2, while Sat1 is now connected to CU2 and CU3.

AT time t2, the UE is only in coverage of Sat1 (connected to CU2) as Sat0 (only connected to CU1) moves away. If the UE had selected the CU1-DU as serving cell at t0 it would now experience a CU-change, when switching to Sat1.

At time t3, Sat1 is now in the position Sat0 had at t0, hence the cycle repeats.

TABLE 1

| Time | Event | Associated CUs to Sat0 | Associated CUs to Sat1 | Optimal serving CU-DU connectivity flow | Suboptimal serving CU-DU connectivity flow |
|---|---|---|---|---|---|
| t0 | UE "appears" (e.g. power on) and is in the coverage area of Sat0. It can choose either CU1-DU or CU2-DU (optimal choice to minimize CU change) | CU1-DU1 CU2-DU2 | CU3-DU1 | CU2-DU2 (through Sat0) | CU1-DU1 (through Sat0) |
| t1 | UE is now in coverage of both Sat0 and Sat1 and performs an intra-CU DU-change (due to Satellite mobility) | CU1-DU1 (CU2 out of coverage and removed) | CU2-DU2 (CU2 is added) CU3-DU1 | CU2-DU2 (through Sat1) | CU1-DU1 (through Sat0) |
| t2 | UE is only in coverage of Sat1 as Sat0 moves away | CU1-DU1 CU0-DU (CU0 not shown in FIG. 1, is added) | CU2-DU2 (CU3 out of coverage and removed) | CU2-DU2 (through Sat1) | CU2-DU2 (through Sat1) CU change |
| t3 | UE remains in coverage of Sat1. This is equivalent to t0: Sat1 positioning in t3 same as Sat0 positioning in t0. | CU0-DU1 (CU0 not shown in FIG.1) | CU1-DU (CU1 is added) CU2-DU | CU2-DU2 (through Sat1) | CU2-DU2 (through Sat1) |

In the example shown in FIGS. 4 and 5 and Table 1, the UE at t0 may benefit from selecting CU2-DU instead of CU1-DU. By doing so, and given that it remains stationary, it will avoid a later CU change at time t2 as highlighted above and be connected to the best feeder link. The problem is how to ensure that a UE, initially connects to the "optimal" CU, irrespective of its location, with the aim of minimizing the CU-change mobility events.

Avoiding a CU change for each DU may beneficial for the served UE because the CU change would require exchanging multiple messages between the satellite DU and the source CU and the target CU, leading to a non-zero data interruption delay on the service link to the UE.

These delays are not known from terrestrial networks since the CU-DU connections do not change, as the DU cells do not move in typical scenarios. However, as the connection to the target CU can first be made after the connection to the source CU is terminated (according to current 5G NR Release 15 specifications) and the one-way delay for LEO satellites at 600 km height is at least 6 ms, one can estimate the potential gap based on the procedures described below.

Figure 6:
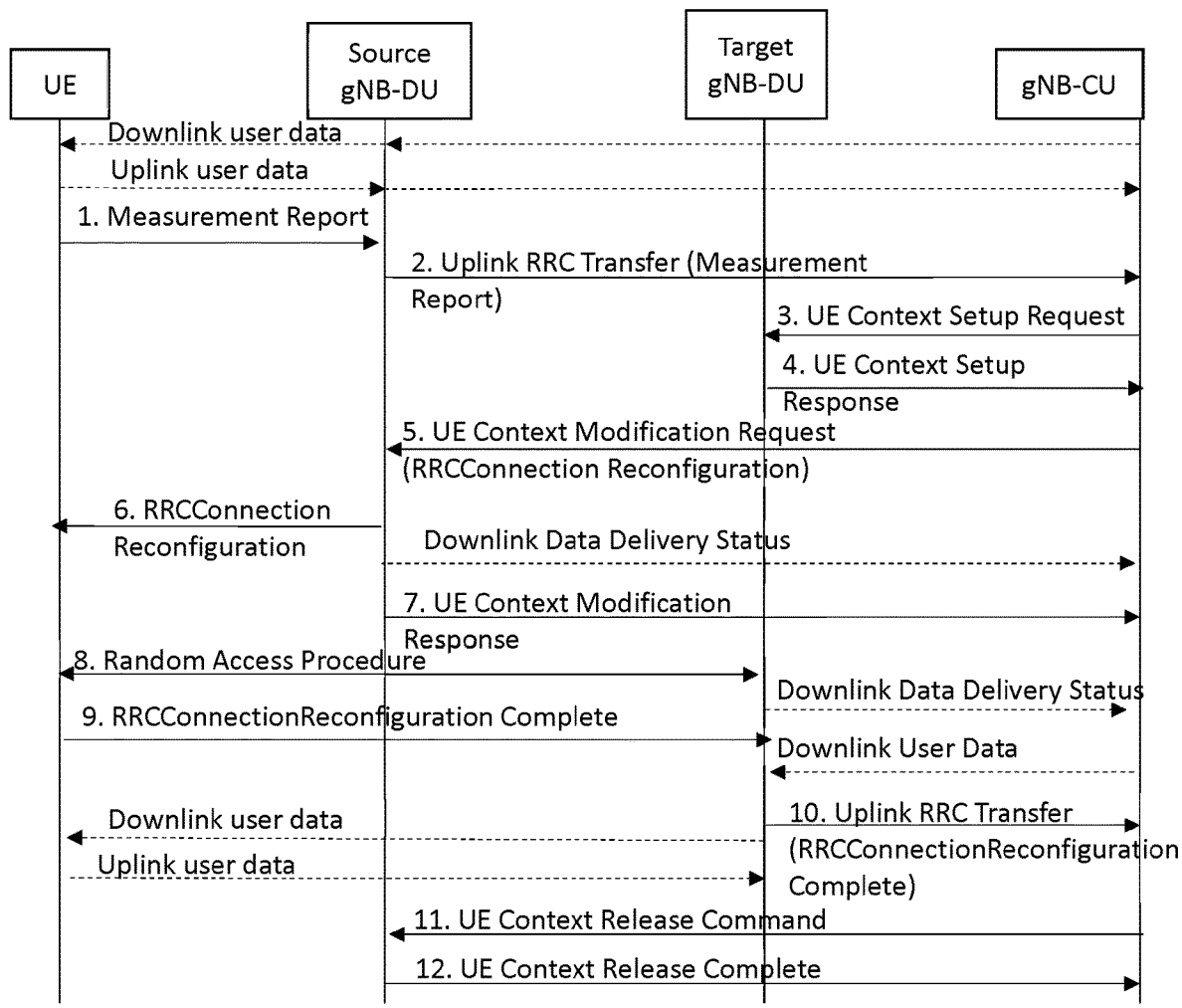
FIG. 6 shows an example signalling flow for Intra-CU Inter-DU mobility.
Figure 7:
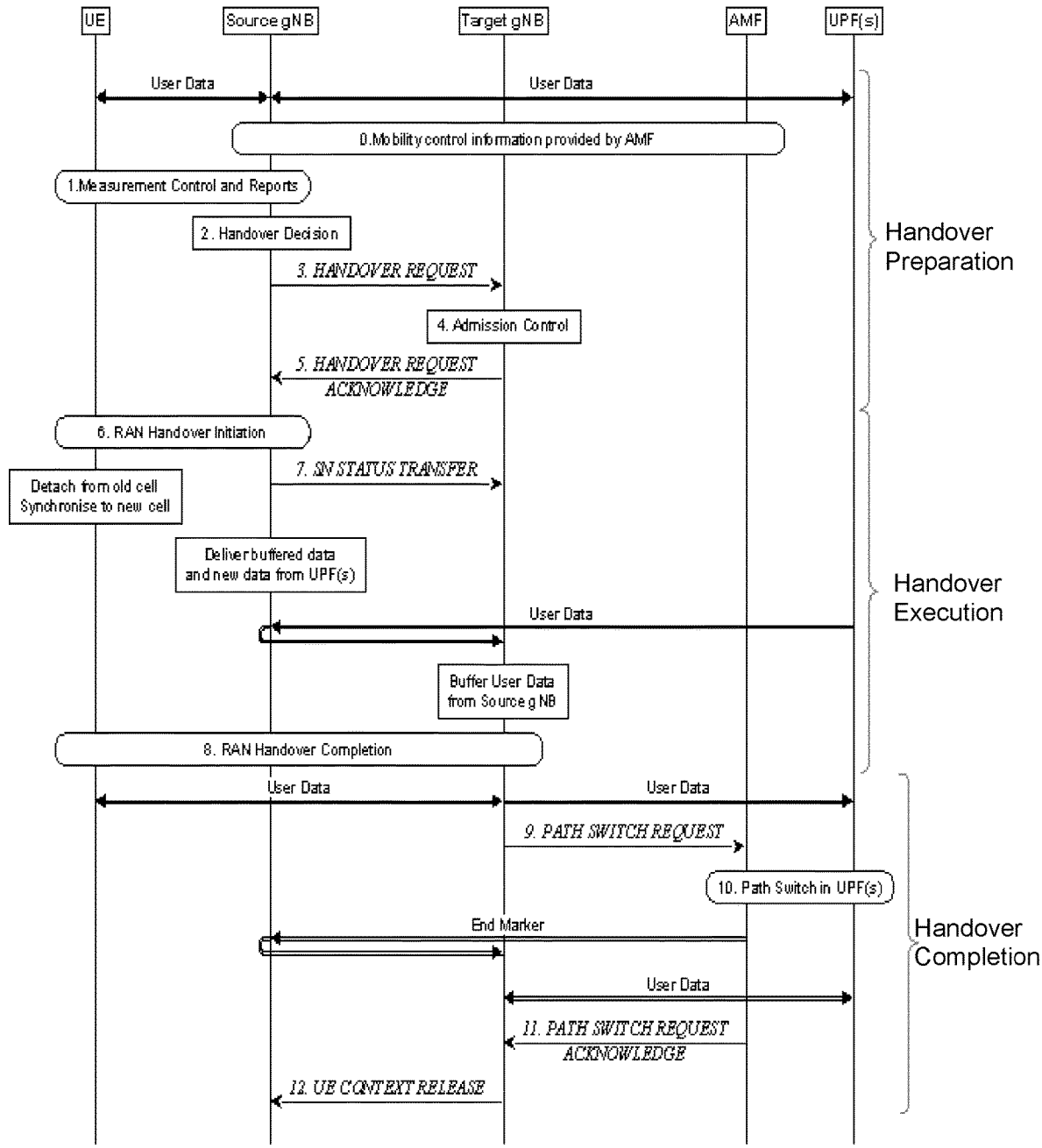
FIG. 7 shows an example signalling flow for inter-gNB handover.

FIGS. 6 and 7 show a signalling flow for a 2-way handshaking In this case, the minimum gap will be 24 ms.

The procedure for a UE moving from a source DU to target DU, when both connect to the same CU (i.e. intra-CU inter-DU change scenario), is illustrated in FIG. 6. The procedure for a UE moving from one CU to another CU corresponds to a regular gNB-gNB handover, as illustrated in FIG. 74, but including the F1 communication between the CU-DU pairs in the source and target gNB. Note the time-consuming need for a path switch in the UPF.

The intra-CU inter-DU mobility is preferred over inter-CU mobility, because of less signalling overhead and lower latency on the U-plane.

In the initial access procedure of NR release 15, the UE will first obtain time and frequency synchronization with a cell through the Primary and Secondary Synchronization Signals (PSS, SSS). The synchronization signals also enable the UE to determine the physical cell ID. The PSS and SSS are part of the Synchronization Signal & PBCH Block (SSB) that is transmitted periodically on each beam in NR. The Physical Broadcast Channel (PBCH) contains Demodulation Reference Signals (DRMS) the Master Information Block and System Information Block 1, which combined provides the UE with enough information to attempt Random Access.

Before the UE can initiate the Random Access procedure, it needs to determine which cell to target. In NR release 15 the network has a few mechanisms for preventing the UE from accessing a specific cell. For each access attempt the UE must select an Access Identity, while the network configures the Access Category (see 3GPP 22.261). The network broadcasts barring control information, which defines the combinations of identity and category that may attempt to access the cell. Furthermore, the UE also needs to determine whether the cell is part of a "forbidden tracking area for roaming" (3GPP 38.300). The cell selection is based on measurements of the SSBs of each detectable cell in each pre-defined frequency band. The selection is made amongst the suitable cells, based on the downlink received power (RSRP/RSRQ). According to 38.213, the UE can assume that the SSS, PBCH DMRS and PBCH data have the same energy per resource element (EPRE), while the ratio between PSS EPRE and SSS EPRE is either 0 or 3 dB.

If a cell is suitable (or acceptable, see 3GPP 38.300) the UE may attempt to connect.

For cell reselection (valid for RRC_Idle and RRC_Inactive), there are a number of criteria, which the network can use to steer the UE. For intra-frequency reselection, the UE must rank the cells based on the measured SSB-based measurements (RSRP/RSRQ), while for inter-frequency the frequencies can be prioritized. Finally, the network may provide black lists for both intra- and inter-frequency cells (3GPP 38.300).

Extracts from TS 38.304 relating to cell selection and cell reselection (intra-frequency) criteria are provided below:

5.2.3.2 Cell Selection Criterion

The cell selection criterion S is fulfilled when:

Srxlev>0 AND Squal>0 where:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 [3] (dB) (NOTE: refers to connEstFailOffset parameter) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1 SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN 3GPP TS 23.122 [9] |
| $Q_{qualminoffset}$ | Offset to the signalled $Q_{qualmin}$ taken into account in the Squal evaluation as a result of a periodic search for a higher priority PLMN while camped normally in a VPLMN 3GPP TS 23.122 [9] |
| $P_{compensation}$ | If the UE supports the additionalPmax in the NS-PmaxList, if present, in SIB1, SIB2 and SIB4: max($P_{EMAX1}$ − $P_{PowerClass}$, 0) − (min($P_{EMAX2}$, $P_{PowerClass}$) − min($P_{EMAX1}$, $P_{PowerClass}$)) (dB); else: max($P_{EMAX1}$ − $P_{PowerClass}$, 0) (dB) |
| $P_{EMAX1}$, $P_{EMAX2}$ | Maximum TX power level of a UE may use when transmitting on the uplink in the cell (dBm) defined as $P_{EMAX}$ in TS 38.101 [15]. $P_{EMAX1}$ and $P_{EMAX2}$ are obtained from the p-Max and NS-PmaxList respectively in SIB1, SIB2 and SIB4 as specified in TS 38.331 [3]. |
| $P_{PowerClass}$ | Maximum RF output power of the UE (dBm) according to the UE power class as defined in TS 38.101 [15] |

5.2.4.6 Intra-Frequency and Equal Priority Inter-Frequency Cell Reselection Criteria The cell-ranking criterion $R_s$ for serving cell and $R_n$ for neighbouring cells is defined by:

$$R_s = Q_{meas,s} + Q_{hyst} - Qoffset_{temp}$$

$$R_n = Q_{meas,n} - Qoffset - Qoffset_{temp}$$

where:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in TS 38.331 [3]. |

The UE shall perform ranking of all cells that fulfil the cell selection criterion S, which is defined in 5.2.3.2.

The cells shall be ranked according to the R criteria specified above by deriving $Q_{meas,n}$ and $Q_{meas,s}$ and calculating the R values using averaged RSRP results.

Cell Range Extension (CRE) is a technique adopted typically to extend the range of a small cell as compared to a macro cell, which is required to offset the large power unbalance between the two layers (e.g. typically transmitting at 40 dBm vs 30 dBm). The UE applies an offset (according to the network provisioned CRE value, e.g. 5 dB) to the measured small cell's RSRP power to artificially boost its received power, making the coverage area of the small cell "breath" and preferring the small cell when being within its "breathing" area. In this concept, the CRE value is set to a static value given a pair of a small cell and a macro cell and the CRE offset is applicable to RRC_Connected UEs and is provided to the UE by means of RRC signalling, i.e. it is not valid for cell (re-)selection of RRC_Inactive/Idle.

FIG. 8 shows a flowchart according to an example embodiment.

In a first step, S1, the method comprises determining which of at least two lower layer radio units co-located at a first location, each lower layer radio unit associated with a higher layer radio unit, has a best path to the associated higher layer radio unit.

In a second step, S2, the method comprises causing the transmit power of the determined one of the at least two lower layer radio units received at a user equipment to be higher relative to the transmit power of any of the other of the at least two lower layer radio units received at the user equipment.

The lower layer radio unit may be a gNB-DU. The higher layer radio unit may be a gNB-CU.

The at least two lower layer radio units may be co-located on a satellite. Each of the higher layer radio units may be located at a different location.

The best path may be defined by handover performance, i.e., the DU that maximizes the time spent on its corresponding CU, which means it minimizes the number of CU handovers.

Determining which of the at least two lower layer radio units has the best path to the associated higher layer radio unit may be based on at least one of the location of the user equipment, the transmit power of a signal received at the at least two lower layer radio units from each of the higher layer radio units (e.g., the best received power), a delay at the higher layer radio units (e.g., the shortest delay) and capacity (e.g., the lowest capacity) of each of the higher layer radio units.

Alternatively, or in addition, when the at least two lower layer radio units are co-located on a satellite, determining which of the at least two lower layer radio units has the best path to the associated higher layer radio unit may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

That is, DUs may adjust their downlink transmit power dynamically and relatively to each other, depending on which is the optimal choice for a UE, so that UEs in RRC_Inactive/Idle connect to the most suitable CU-DU. The increase, or boost, in the transmit power may be real or virtual.

Figure 9:
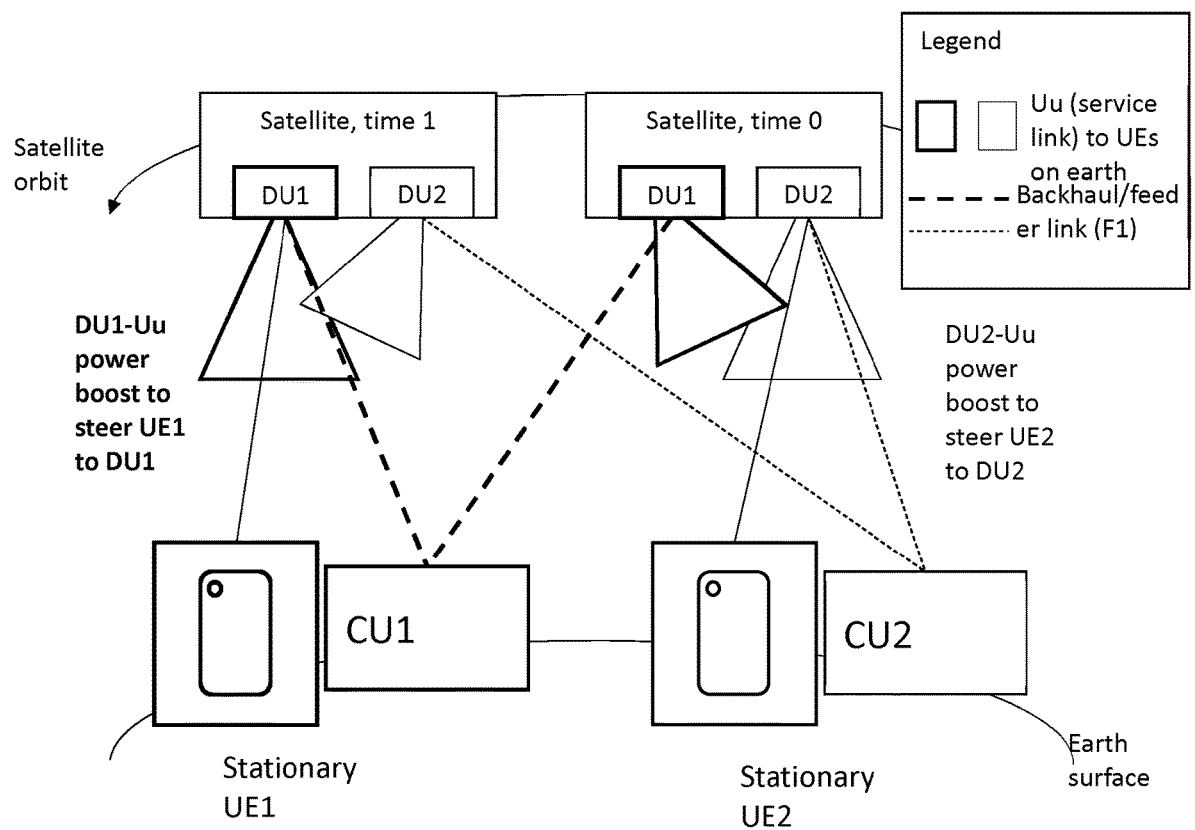
FIG. 9 shows a schematic diagram of a power boost according to an example embodiment.

FIG. 9 illustrates schematically the general idea of downlink transmit power boosting. The stationary UE1 on the Earth's surface receives a DU1 Uu power boost to steer UE1 to DU1 on the satellite (connected via backhaul/feeder link to CU1) at time 1. The stationary UE2 receives a DU2-Uu power boost to steer UE2 to DU2 on the satellite (connected via backhaul/feeder link to CU2) at time 0.

A method as describe with reference to FIGS. 8 and 9 applies dynamic downlink transmit power boosting (real or virtual) to steer the UE to select the optimal DU among two or more DUs, with similar radio characteristics (e.g. co-located and operating at similar carrier frequencies). The optimal DU is the one connected to the CU that minimizes or avoids subsequent CU changes, i.e. it will result in minimum CU changes for a stationary UE and shortest feeder link.

Without the DU power boost the UE may experience a CU change (see FIGS. 4 and 5 and Table 1), which is costly in terms of more signalling and higher latency (see FIG. 6 and FIG. 7). The UE may also experience longer delays on the feeder link.

The downlink transmit power boost may be a real power increase or a virtual boost.

The virtual power boost may be achieved through the UE biasing the measured values according to network signalling. The method may comprise providing an indication to the user equipment of an offset for the received transmit power In one example implementation, the network (e.g., DU) indicates to the UE a dynamic DU power offset (DUPO) to apply to the measured SSB-based RSRP value to virtually boost the power of the optimal DU relative to the other (co-located) DU. The virtual boost entails the UE will prefer the boosted DU over the non-boosted DU, e.g. for cell (re-) selection.

In case of the virtual boost, in one example implementation the network pre-provisions the UEs with a virtual power boosting function and then provides (e.g. via SIB) the parameters (e.g. power offset) to be used in the virtual boosting function by RRC_Inactive/Idle UEs.

The offset may be a negative offset or a positive offset. If the power of a DU is virtually boosted compared to the other DU, the UE may select the sub-optimal DU during the initial cell selection, because the RSRP will be the same. It would then require a cell re-selection to move to the optimal DU, and in the meantime the UE may have set up the connection with the suboptimal DU (CU), leading to a costly CU change. To ensure this does not happen the non-boosted DU needs a "negative offset" for cell-selection, which may be achieved by increasing either $Q_{rxlevmin}$ or $Q_{rxlevminoffset}$.

For cell-reselection the boosted DU needs a positive offset relative to the non-boosted DU (achieved through to $Q_{offset}$) to ensure the boosted DU ranks higher than the non-boosted.

The indication of the offset may be provided through dedicated signalling or in a broadcast channel. The offsets may be provided through the existing cell (re-) selection parameters. Therefore, all UEs under the coverage area of the satellite with dual-DU would use the same boosting function and power boosting parameters. Alternatively, or in addition, the network may provide the offset value at regular intervals in its SIBs.

The method may comprise increasing the transmit power of the determined lower layer radio unit relative to the transmit power of any of the other of the lower layer radio units.

In another example implementation the optimal DU (from CU feeder link perspective, i.e., the determined one of the at least two lower layer radio units) will boost dynamically the real transmit power of its broadcast channels (e.g. PSS/SSS/PBCH) relatively to the other DU (not to be selected) such that the UE will measure a higher SSB-based RSRP value (downlink receive power level), based on which it will prefer the boosted DU (and for instance will make a cell (re-)selection to it or will initiate a connection request to it).

The relative increase in the transmit power may be based on at least one of the location of the user equipment and the transmit power of a signal received from at the at least two lower layer radio units from the associated higher layer radio unit.

For example, when a DU boosts its real power dynamically and relative to another DU on the same satellite, the DU will base the downlink power boost level on the received power from its ground station (the feeder link). That is, the higher the received power (and similarly the shorter the distance), the higher the transmit power to steer the UE to connect to it. The virtual power boost may utilize the same method of feeder link received power to control the power boost level.

The method may be beneficial since when the satellite (with the dual-DU) moves further away from a ground station (providing the F1 backhaul to the associated CU), it is less likely that the associated CU is the optimal choice for the UEs being served by the satellite.

Figure 10:
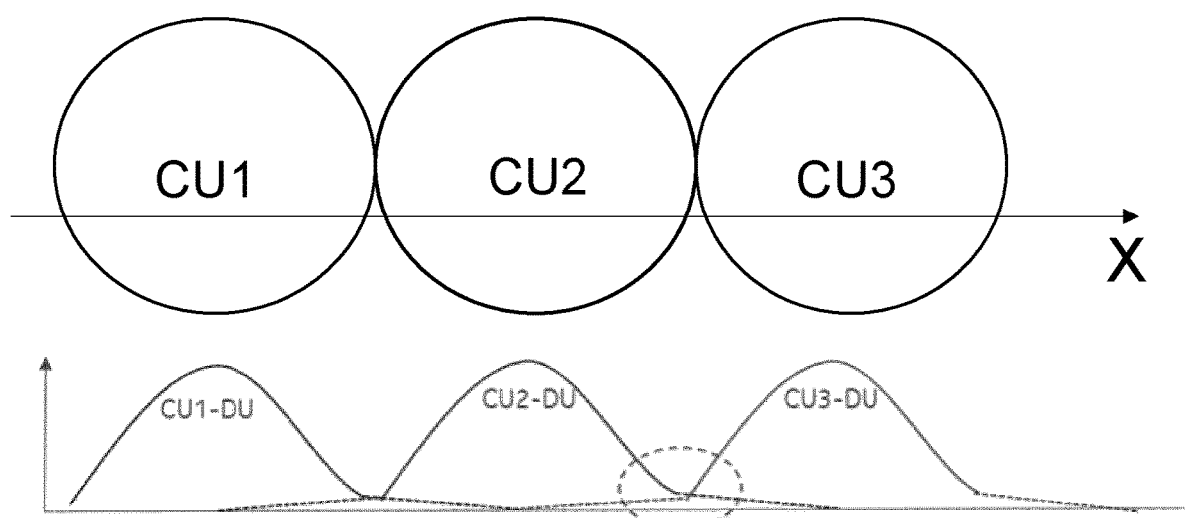
FIG. 10 shows a relationship between a relative power increase and satellite trajectory.

The scheme is illustrated in FIG. 10 which shows the relative power boost to the other on-board DU. The path of dual DU satellite path is shown by arrow X. The circles indicate an area where a CU is the closest to a satellite. In this example, the CU1-DU boosts its power relative to the distance (or received power) to the CU1 location on Earth The shorter the distance (or received power) the higher the transmit power. When the satellite gets closer to CU2, the CU1-DU power level reduces to the baseline, while the CU2-U2 power increases. At the CU2-CU3 border, the satellite will apply similar transmit power in both DUs, making it a random choice for the UE.

The shape of the power boost shown in FIG. 10, relative to another DU on the same satellite, is only for illustration purposes. The relative power boost may take any shape and be either continuous or discrete.

Alternatively, or in addition, the relative increase in the transmit power may be based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment. For example, the downlink power boost may be based on the deterministic satellite trajectory, satellite constellation, combined with the knowledge of the fixed ground stations' locations (and CU locations).

Figure 11:
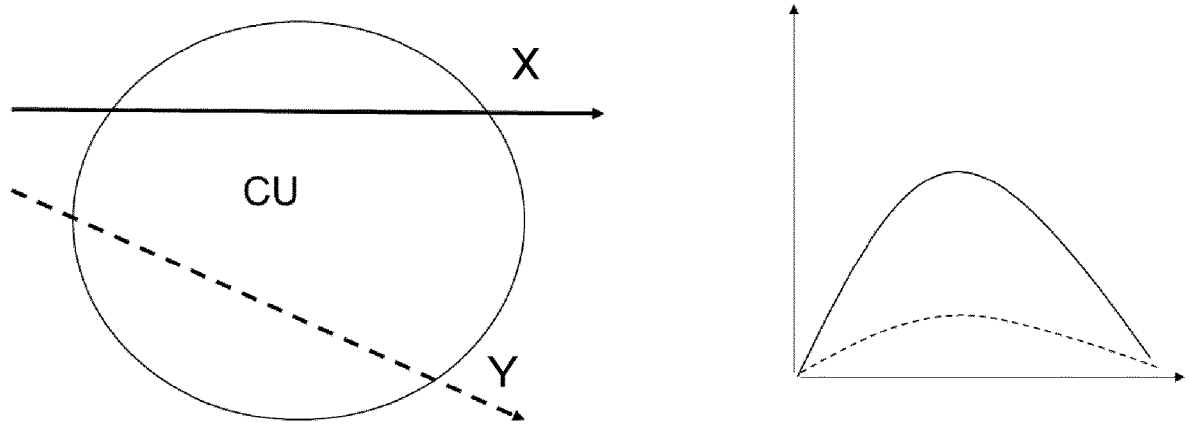
FIG. 11 shows a relationship between a relative power increase and satellite trajectory.

FIG. 11 is an example of how the power boost may be changed as a function of the satellite trajectory. The paths of dual DU satellites of an area where a CU is closest to a satellite are shown by the arrows X and Y. The path X is a direct over-pass and the path Y is a partial over-pass. The relative power boost to the other on-board DU shown on the y-axis of the chart as a function of the path.

Changing the downlink transmit power may lead to a change in the UE receive power, causing the UE to select the "optimal" CU, i.e. to select the lower layer radio unit having the best path to the associated higher layer radio unit. However, the UE may estimate a different propagation loss, unless it is notified that the DU downlink transmit power has changed. The propagation loss is used by the UE for uplink transmit power control (UL TPC), where the propagation loss is compensated with a factor: alpha (3GPP 38.213). If, e.g., the downlink transmit power is boosted 3 dB, the UE will estimate the propagation loss has dropped 3 dB and thus reduce the uplink transmit power 3 dB. This may lead to degraded uplink performance.

In NR the ServingCellConfigCommon information element (3GPP 38.331) of System Information Block 1 (SIB1) optionally contains the ss-PBCH-BlockPower, which defines the downlink transmit power for the SSB. SIB1 is transmitted in the PDSCH periodically 160 ms, but with variable repetitions within that window. In order to ensure proper UL TPC, when using downlink transmit power boosting, it may be necessary to broadcast the ss-PBCH-BlockPower more often. This depends on the satellite constellation, specifically the number of satellites and their altitude.

The method may be implemented in a control apparatus as described with reference to FIG. 3.

An apparatus may comprise means for determining which of at least two lower layer radio units co-located at a first location, each lower layer radio unit associated with a higher layer radio unit, has a best path to the associated higher layer radio unit and causing the transmit power of the determined one of the at least two lower layer radio units received at a user equipment to be higher relative to the transmit power of any of the other of the at least two lower layer radio units received at the user equipment.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to non-terrestrial networks (NTN), similar principles can be applied in relation to other networks and communication systems where higher layer radio unit-lower layer radio unit split architecture is used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus, comprising:
at least one processor; and
at least one memory comprising computer program code,
the at least one memory and computer program code being configured, with the at least one processor, to cause the apparatus at least to perform:

determining which of at least two lower layer radio units co-located at a first location, each lower layer radio unit associated with a higher layer radio unit, has a best path to the associated higher layer radio unit; and dynamically adjusting a transmit power of the determined one of the at least two lower layer radio units received at a user equipment to be higher relative to a transmit power of any of the other of the at least two lower layer radio units received at the user equipment.

2. The apparatus according to claim 1, wherein causing the transmit power of the determined one of the at least two lower layer radio units received at the user equipment to be higher relative to the transmit power of any of the other of the lower layer radio units received at the user equipment comprises increasing the transmit power of the determined distributed unit relative to the transmit power of any of the other of the lower layer radio units.

3. The apparatus according to claim 1, wherein the causing the transmit power of the determined one of the at least two lower layer radio units received at the user equipment to be higher relative to the transmit power of any of the other of lower layer radio units received at the user equipment comprises providing an indication to the user equipment of an offset for the received transmit power.

4. The apparatus according to claim 3, wherein the offset comprises a negative offset applicable to the transmit power received from any of the other of the at least two lower layer radio units.

5. The apparatus according to claim 3, wherein the offset comprises a positive offset applicable to the received power from the determined one of the at least two lower layer radio units.

6. The apparatus according to claim 3, wherein the at least one memory and computer program code are further configured, with the at least one processor, to cause the apparatus at least to perform:

providing the indication of the offset in a broadcast channel or dedicated signalling to the user equipment.

7. The apparatus according to claim 1, wherein the at least two lower layer radio units are co-located on a satellite.

8. The apparatus according to claim 7, wherein the relative increase in the transmit power is based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

9. The apparatus according to claim 7, wherein the determining is based on at least one of the satellite's trajectory and a trajectory of a second satellite having a further lower layer radio unit, wherein the further lower layer radio unit is a potential target serving radio unit for the user equipment and is connected to a current serving higher layer radio unit of the user equipment.

10. The apparatus according to claim 1, wherein the relative increase in the transmit power is based on at least one of the location of the user equipment and the transmit power of a signal received at the at least two lower layer radio units from each of the higher layer radio units.

11. The apparatus according to claim 1, wherein the determining is based on at least one of the location of the user equipment, the transmit power of a signal received at the at least two lower layer radio units from each of the higher layer radio units, a delay at the higher layer radio units and capacity of each of the higher layer radio units.

12. The apparatus according to claim 1, wherein the best path is defined by handover performance.

13. The apparatus according to claim 1, wherein each lower layer radio unit comprises a next generation NodeB distributed unit, gNB-DU and each higher layer radio unit comprises a next generation NodeB centralised unit, gNB-CU.

14. The apparatus according to claim 1, wherein each of the higher layer radio units is located at a different location.

15. A method, comprising:

determining which of at least two lower layer radio units co-located at a first location, each lower layer radio unit associated with a higher layer radio unit, has a best path to the associated higher layer radio unit; and dynamically adjusting a transmit power of the determined one of the at least two lower layer radio units received at a user equipment to be higher relative to a transmit power of any of the other of the at least two lower layer radio units received at the user equipment.

16. A non-transitory computer readable medium comprising program instructions for causing an apparatus to perform at least the following:

determining which of at least two lower layer radio units co-located at a first location, each lower layer radio unit associated with a higher layer radio unit, has a best path to the associated higher layer radio unit; and dynamically adjusting a transmit power of the determined one of the at least two lower layer radio units received at a user equipment to be higher relative to a transmit power of any of the other of the at least two lower layer radio units received at the user equipment.

\* \* \* \* \*